O. B. OLLER.
NUT LOCK.
APPLICATION FILED NOV. 7, 1916.

1,240,245.

Patented Sept. 18, 1917.

Witnesses

Inventor
O. B. Oller
By
Attorneys

UNITED STATES PATENT OFFICE.

OSCAR B. OLLER, OF LOS ANGELES, CALIFORNIA, ASSIGNOR OF ONE-HALF TO H. F. SCHULZ, OF SANTA ANITA, CALIFORNIA.

NUT-LOCK.

1,240,245.  Specification of Letters Patent.  Patented Sept. 18, 1917.

Application filed November 7, 1916. Serial No. 129,988.

*To all whom it may concern:*

Be it known that I, OSCAR B. OLLER, a citizen of the United States, residing at Los Angeles, in the county of Los Angeles, State of California, have invented certain new and useful Improvements in Nut-Locks; and I do hereby declare the following to be a full, clear, and exact description of the invention, such as will enable others skilled in the art to which it appertains to make and use the same.

The present invention is directed to improvements in nut locks, and has for its object to provide a device of this character so constructed that the nut can be firmly interlocked with the bolt, whereby the nut and bolt will be held against relative rotation.

A further object of the invention is to provide a novel form of key, which when engaged with the nut and bolt will be held against accidental disengagement.

A still further object of the invention is to provide a key so constructed that the same can be driven into engagement with the nut and bolt, and when in place the same will be held positively against accidental displacement.

With these and other objects in view, this invention resides in the novel features of construction, formation, combination and arrangement of parts to be hereinafter more fully described claimed and illustrated in the accompanying drawing, in which:—

Figure 1:
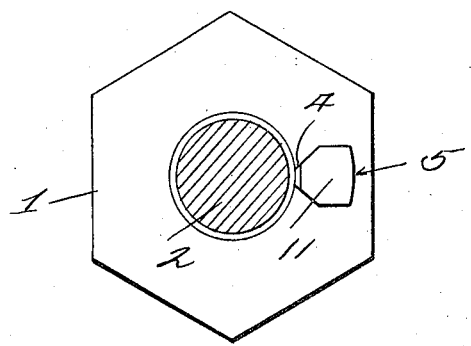
Figure 1 is an end view of the nut showing it in place on the bolt.
Figure 2:
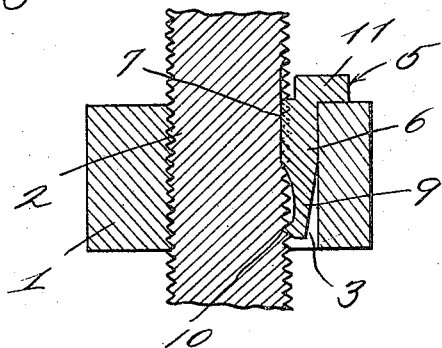
Fig. 2 is a longitudinal sectional view.
Figure 3:
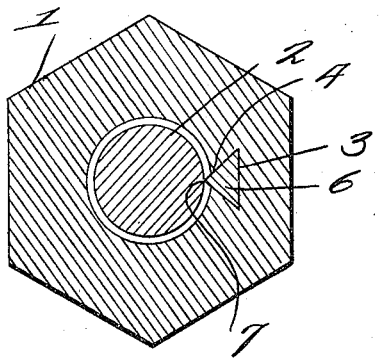
Fig. 3 is a transverse sectional view.
Figure 4:
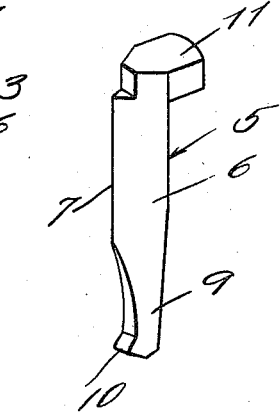
Fig. 4 is a detail perspective view of the key.

Referring to the drawing 1 indicates the nut which is provided with the usual threaded opening 2, and formed in the nut and extending longitudinally of the bore is a channel 3, said channel being triangular in cross section and communicates with the bore, as at 4.

The key 5 has its body 6 shaped to conform to the shape of the channel 3 so as to provide a cutting edge 7 which is adapted to extend into the bore of the nut so that when the key is driven into the channel the cutting edge will cut into the threads of the bolt 8. The inner end of the body 6 terminates in a resilient shank 9, said shank having its inner end provided with a tooth 10 which is adapted to engage the threads of the bolt so as to prevent accidental disengagement of the key.

The outer end of the body 6 is provided with a head 11 which serves to receive the impact of blows from a hammer or the like when it is desired to apply the key, said head being of such size as to engage the front face of the nut to limit the inward movement of the key.

It will be noted that the shank 9 is inclined downwardly so that when the key is driven into the channel sufficient room will be had to permit the shank to flex as the tooth rides over the threads of the bolt 8.

From the foregoing description it will be seen that a nut lock has been provided which is exceedingly simple in construction, and one which includes the key adapted to be driven into the channel 3, so that the cutting edge carried by the key will bite into the threads of the bolt so as to prevent relative rotation of the nut and bolt, and that the tooth 10 will serve, when engaged with the threads of the bolt will prevent accidental disengagement of the key.

What is claimed is:—

In a nut lock, the combination with a bolt, of a nut threaded on the bolt, said nut having a channel formed longitudinally of its opening, a key having a cutting edge adapted to engage the threads of the bolt when said key is engaged in the channel, the inner end of said key having a resilient shank carried thereby, said shank having a tooth for yieldably engaging the threads of the bolt, and a head formed on the outer edge of the key, as and for the purpose set forth.

In testimony whereof, I affix my signature, in the presence of two witnesses.

OSCAR B. OLLER.

Witnesses:
 PHILIP PLAYTER,
 FRANK RHODES.

Copies of this patent may be obtained for five cents each, by addressing the "Commissioner of Patents, Washington, D. C."